United States Patent [19]

Varrasso

[11] 4,435,811
[45] Mar. 6, 1984

[54] CURRENT DISTRIBUTION FOR GLASS-MELTING FURNACES

[75] Inventor: Eugene C. Varrasso, Heath, Ohio

[73] Assignee: Owens-Corning Fiberglas Corporation, Toledo, Ohio

[21] Appl. No.: 342,869

[22] Filed: Jan. 26, 1982

[51] Int. Cl.³ .............................................. C03B 5/027
[52] U.S. Cl. ..................................................... 373/39
[58] Field of Search ....................... 373/27, 29, 39–41, 373/120, 135

[56] References Cited

U.S. PATENT DOCUMENTS 2,314,956  3/1943  Slayter et al. ......................... 373/40
3,182,112  5/1965  Torok .................................... 373/40

*Primary Examiner*—Roy N. Envall, Jr.
*Attorney, Agent, or Firm*—Ronald C. Hudgens; Patrick P. Pacella

[57] ABSTRACT

An electric glass-melting furnace is disclosed having a first embodiment comprising: a chamber adapted for holding a body of molten glass, such for withdrawing molten glass therefrom, an arc electrode positioned in the body of molten glass; first and second electrodes positioned in the body of molten glass; a reactance means comprising a coil wound on a core, such coil having a first and second end and a center tap, the first end of the coil being connected to the first electrode and the second end of the coil being connected to the second electrode; and means for supplying electrical power to the arc electrode and the first and second electrodes, a first terminal of the power supplying means being connected to the arc electrode and a second terminal being connected to the center tap. The current flow through the first and second electrode is equalized by the coil. This embodiment may be modified to use a three phase power supply for powering three arc electrodes. A second embodiment of the invention uses only resistive heating produced by equalized current flow through individual electrodes which are contained in first and second arrays of n electrodes disposed within the glass. A third embodiment of the invention uses a combination of resistance heating electrodes and an arc electrode in which the current flow is equalized through individual electrodes that are contained in first and second arrays of n electrodes disposed within the glass. The third embodiment may be modified to use a three phase power supply for powering three arc electrodes.

17 Claims, 7 Drawing Figures

CURRENT DISTRIBUTION FOR GLASS-MELTING FURNACES

BACKGROUND OF THE INVENTION

This invention relates to the production of glass fibers, e.g., fibers made by melting particulate batch ingredients or minerals, including basalt and the like, and, more particularly, to an electric furnace which uses an arc and/or electrodes for causing electrical current to flow through the batch for melting such batch materials.

The copending patent application of Charles S. Dunn, Ser. No. 342,852 which has been assigned to a common assignee, discloses an arc glass-melting furnace which utilizes a plurality of electrodes positioned in the bottom of the furnace to complete the arc circuit. It has been found that in certain instances a majority of the current is conducted through the molten glass to one electrode rather than being split equally between the electrodes. This problem is created by the negative temperature coefficient of glass which causes a decrease in the resistance of the body of molten glass as the temperature is increased. As a result thereof, the conductivity of the glass increases with the increasing temperature to produce an unlimited or runaway local heating condition. Accordingly, when more of the current from the arc electrode flows to one of the electrodes than the other, the increased current flow will cause a temperature rise which, in turn, causes a reduction of the effective resistance path to that electrode because of the negative temperature coefficient, thereby causing even more current to flow to that electrode with the result that a smaller portion flows to the other electrode. This unbalance can result in devitrification of the glass in the cooler portions of the furnace through which the lesser amount of current is flowing and damage to the furnace structure in the portion that is undergoing the runaway heating condition.

Therefore, it is an object of the present invention to provide an arc glass-melting furnace that balances the current flowing from the arc electrode through the molten glass, thereby preventing devitrification and insuring a uniform temperature throughout the molten glass.

It is also an object of the present invention to provide an electrically heated glass-melting furnace which uses only resistive heating produced by equalized current flow through individual electrodes disposed within the glass to produce uniform temperatures throughout the glass sufficient to permit glass fibers to be drawn directly from the furnace without further processing.

SUMMARY OF THE INVENTION

In accordance with the present invention there is provided an electric glass-melting furnace comprising a chamber adapted for holding a body of molten glass, such chamber having means for supplying batch thereto and means for withdrawing the molten glass therefrom. An arc electrode is positioned in the chamber above the upper surface of the body of molten glass, and first and second electrodes are positioned in the body of molten glass in the chamber. A reactance means, which comprises a center-tapped coil wound on a core, has one end of the coil connected to the first electrode and the other end connected to the second electrode. A first terminal of a means for supplying electrical power is connected to the arc electrode, and a second terminal is connected to the center tap of the reactance means. The first and second electrodes that are utilized for completing the arc circuit may also be used for normal resistive heating of the molten glass if a second source of electrical power is connected across them. In this instance, the coil is sized so that its impedance is large enough to prevent loading of the second power supply, except with a small lagging current.

In the three phase embodiment, the present invention includes three arc electrodes positioned in the chamber above the upper surface of the molten glass. A three phase power supply connected in a wye-configuration is applied to the three arc electrodes with the common point being connected to the center tap of the reactance means.

An alternative embodiment of the present invention utilizes a transformer having a center-tapped secondary to supply Joule (resistive) heating with the windings of the secondary serving as the magnetic reactor for equalizing the current through the electrodes. If the arc heating and resistive heating are employed in the melter, the arc circuit primarily provides the power to melt the batch material to form molten glass and the Joulean circuit primarily provides the power to control the temperature of the glass to provide a uniform exit temperature from the melter.

Another embodiment of the invention uses a combination of resistive heating electrodes and an arc electrode to melt glass. First and second arrays of n resistive heating electrodes, wherein n is an integer greater than two, are disposed within the glass. An arc electrode is positioned above the glass. First and second power supplies, each having first and second output terminals provide current for powering the resistive heating electrodes and the arc electrode. Means are provided for equalizing current flow within the individual electrodes of the first and second arrays which is comprised of first and second arrays of $n-1$ center tapped inductors each having first and second ends. A center tapped current splitting inductor is provided having first and second ends which are respectively coupled to the center taps of the first and second arrays of $n-1$ center tapped inductors. The first and second output terminals of the first power supply are respectively coupled to the center taps of the first and second arrays of $n-1$ center tapped inductors. The first and second output terminals of the second power supply are respectively coupled to the center tap of the current splitting inductor and the arc electrode. The first and second ends of each inductor within the first array of n31 1 inductors are coupled to a different electrode within the first array of n electrodes. The first and second ends of each inductor within the second array of $n-1$ inductors are coupled to a different electrode within the second array of n electrodes. This embodiment may be modified to use a three phase power supply to power three arc electrodes.

Another embodiment of the invention is a glass furnace which uses only resistive heating produced by equalized current flow through individual electrodes within the glass. First and second arrays of n electrodes, wherein n is an integer greater than two, are disposed within the glass between the individual electrodes within the arrays. Means are provided for equalizing the current flow within the individual electrodes which is comprised of first and second arrays of $n-1$ center tapped inductors each having first and second ends. The center taps of the first array of n−1 inductors are coupled to a first terminal of a means for supplying electrical current and the first and second ends of each inductor within the first arrays are coupled to a different electrode within the first array of n electrodes. The center taps of the second array of n−1 inductors are coupled to a second terminal of the means for supplying electrical current and the first and second ends of each inductor within the second array of electrodes.

The present invention tends to balance the current flowing within the individual electrodes disposed within the glass despite any variation of resistance that might occur in the current paths through the molten glass. Balancing the current flow within the electrodes disposed within the glass insures that the current from the arc electrode is distributed equally through the pool of molten glass, thereby minimizing hot streaks and providing a uniform temperature distribution through the melter. Accordingly, the present invention overcomes the inherent instability in Joulean heating of glass caused by the negative temperature coefficient.

Other objectives, advantages and applications of the present invention will be made apparent by the following detailed description of the preferred embodiments of the present invention.

DETAILED DESCRIPTION OF THE PREFERRED EMBODIMENTS

Figure 1:
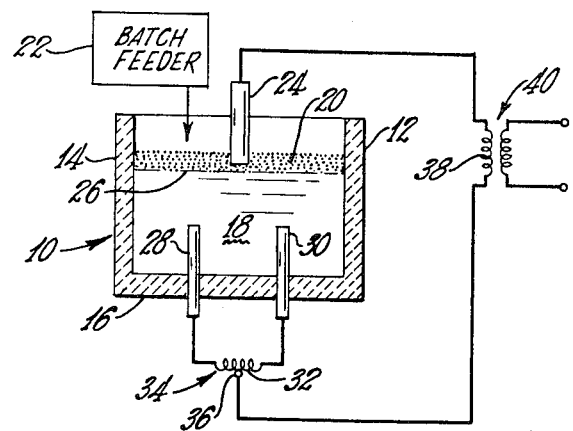
FIG. 1 is a partial diagrammatic of an arc glass-melting furnace utilizing the present invention.

Referring to FIG. 1, an arc glass-melting furnace utilizing the present invention is indicated generally by numeral 10. Furnace 10 has sidewalls 12 and 14 which are made of a refractory material having superior wear characteristics, such as chromic oxide, and a bottom wall 10 which is made of refractory material having a high resistance in relation to the resistance of the molten glass, such as fused cast alumina and zirconia. Furnace 10 contains a pool of molten glass 18 and a supply of batch material 20 which is fed from a batch feeder shown generally by numeral 22. Preferably, batch feeder 22 is a batch feeder system as disclosed in the copending patent application of Charles S. Dunn, et al., U.S. Ser. No. 342,853, which was filed on the same day as the instant application now U.S. Pat. No. 4,385,918, issued May 31, 1983, and is assigned to a common assignee.

An arc electrode 24 is positioned above upper surface 26 of pool of molten glass 18. Electrodes 28 and 30 are inserted through apertures in bottom wall 16 into molten glass 18 such that they are equidistant vertically and axially from arc electrode 24. One end of coil 32 of magnetic reactor 34 is connected to electrode 28, and the other end is connected to electrode 30. Center tap 36 of coil 32 is connected to one side of low voltage winding 38 of transformer 40; the other side of low voltage winding 38 is connected to arc electrode 24.

The power supplied by transformer 40 causes an electric arc to be formed between electrode 24 and upper surface 26 of molten glass 18 with electric current passing through molten glass 18 to electrodes 28 and 30 and to the respective ends of coil 32. If the current flowing through each half of coil 32 is equal, no net magnetic flux is generated in the core of magnetic reactor 34. However, if the current increases in one of the legs, a net flux is generated in the core. The direction of the flux is such that it increases the impedance to current flow in the high current leg and decreases the impedance to current flow in the low current leg. The electromotive force generated by the flux opposes the driving voltage from the transformer 40 in the high current leg and assists the driving voltage in the low current leg. Balancing of the current between electrodes 28 and 30 prevents hot spots or streaking caused by the negative temperature coefficient of molten glass 18.

Figure 2:
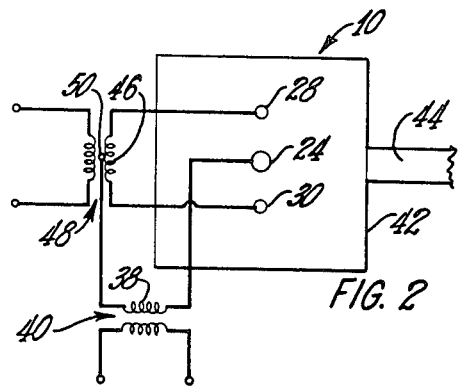
FIG. 2 is a diagrammatic plan view of an alternative embodiment according to the present invention.

Referring to FIG. 2 an alternative embodiment of the present invention is shown in which the electrodes that complete the arc circuit are also used for Joulean heating to provide greater temperature control of the glass exiting from the furnace. Furnace 10 has a melting tank 42 from which the molten glass may be removed through throat 44. Arc electrode 24 and electrodes 28 and 30 are positioned in furnace 10 as described hereinabove in reference to FIG. 1. Electrodes 28 and 30 are respectively connected to one end of low voltage winding 46 of transformer 48. Center tap 50 of low voltage winding 46 is connected to one side of secondary winding 38 of transformer 40; the other side of secondary winding 38 is connecting to arc electrode 24.

As described hereinabove, an electric arc is created between arc electrode 24 and the upper surface of the molten glass with the circuit being completed through the molten glass to electrodes 28 and 30. The current flowing through electrodes 28 and 30 is balanced by low voltage winding 46 of transformer 48 as described hereinabove in reference to magnetic reactor 34 of FIG. 1. Transformer 48 causes a current to flow between electrodes 28 and 30 that is independent of the current flowing from arc electrode 24. Furnace 10 is operated such that the arc electrode circuit primarily provides the heat necessary to melt the batch materials to form molten glass, and the Joulean circuit primarily provides the temperature control necessary for maintaining a uniform exit temperature of the molten glass. If desired, a separate set of electrodes may be employed for the resistive heating with electrodes 28 and 30 serving only the arc circuit. In this embodiment, the electrodes are equally spaced vertically and axially from arc electrode 24, such that the electrodes form a rectangle around arc electrode 24 with electrodes 28 and 30 being located on one diagonal and the resistive heating electrodes being located on the other diagonal.

Figure 3:
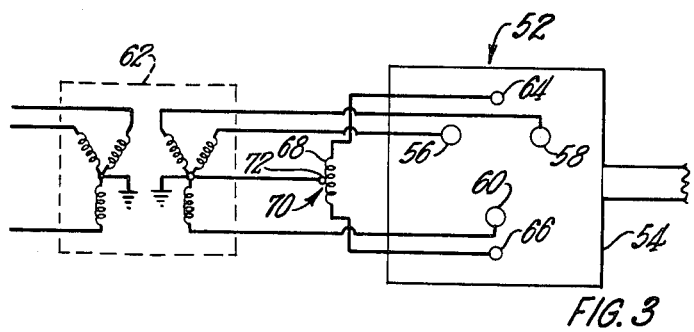
FIG. 3 is a diagrammatic plan view of an arc glass-melting furnace utilizing the present invention in a three phase configuration.

Referring to FIG. 3, a furnace 52 is shown utilizing the present invention in a three phase embodiment. Furnace 52 has a melting tank 54 in which three arc electrodes, 56, 58 and 60, are symmetrically positioned therein above the upper surface of the molten glass. Each of arc electrodes 45, 58 and 60 is connected to a separate leg of the secondary of the three phase transformer bank shown generally by numeral 62. The secondary of transformer bank 62 is connected in a wye-configuration with the midpoint grounded. Electrodes 64 and 66 are positioned in the bottom of melting tank 54, preferably outside of the triangle formed by electrodes 56, 58 and 60, and are respectively connected to one end of coil 68 of magnetic reactor 70. Center tap 72 of coil 68 is connected to the grounded midpoint of the low voltage winding of transformer bank 62.

Figure 4:
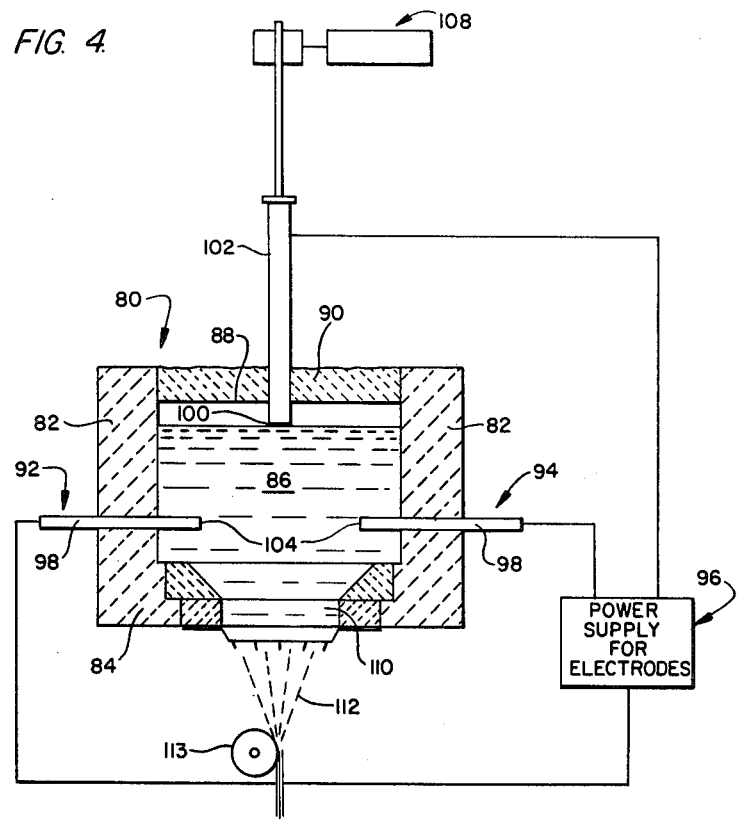
FIG. 4 is a plan elevational view of another embodiment of the present invention.

FIG. 4 illustrates a plan elevational view of another embodiment of the present invention which uses the combination of two arrays of n electrodes disposed within the glass and an arc electrode to heat molten glass to a sufficiently uniform temperature to permit glass fibers to be drawn directly from the bottom of the furnace through a textile type bushing. This embodiment of the invention, while not limited thereto, is particularly useful for applications which mix batches of glass which do not require throughput of the magnitude produced by electric furnaces of the type illustrated in FIGS. 1-3. The furnace has a chamber 80 having a plurality of sides 82 and a bottom 84 which contains the molten glass 86 which has been melted from batch introduced through the top 88 when the batch cover 90 has been removed. The sides 82 and bottom 84 of the furnace are made from a suitable refractory material which can withstand the high temperature attendant with melting the glass. First and second arrays 92 and 94 of n individual electrodes 98 are mounted within the sides 82 of the chamber 80. The number n is an integer greater than two. A power supply 96 provides electrical current to the arrays of electrodes 92 and 94 and the arc electrode 102 for causing current to flow through the molten glass 86 between the individual electrodes 98 of the respective arrays and the arc electrode. A means for equalizing current flow in the individual electrodes 98 of the arrays 92 and 94 is provided within the power supply 96 which is discussed in detail in conjunction with FIG. 5 infra. Heating of the molten glass is produced by the arc 100 which is drawn between arc electrode 102 and the molten glass 86 and by the high density current flow at the interface 104 between the individual electrodes 98 and the molten glass. A suitable mechanism 108, which may be of any known design, is provided for raising and lowering the arc electrode 102 to permit the drawing of the arc 100. The mechanism for raising and lowering the arc electrode 102 may be mechanically or hydraulically powered. A textile type fiber forming bushing 110 is mounted in the bottom 84 of chamber 80 for drawing glass fibers 112. The fibers 112 may be guided by pulling winder 113 and fed to a suitable wrapping mechanism which is not illustrated. The fiber forming bushing may be a foraminous plate having a plurality of apertures which are sized to draw glass fibers of the desired denier. The combination of heating produced by arc 100 and resistive heating in the vicinity of the interface 104 of the individual electrodes 98 within the molten glass 86 produces sufficiently uniform heating within chamber 80 to permit the fibers to be drawn without requiring further heat processing to produce a sufficiently uniform temperature within the glass to permit drawing. The individual electrodes 96 may be made of molybdenum. It should be understood that the embodiment of FIG. 4 is not limited to the use of two electrodes 98 within the arrays 92 and 94 and that any number of electrodes greater than two may be used within each array.

Figure 5:
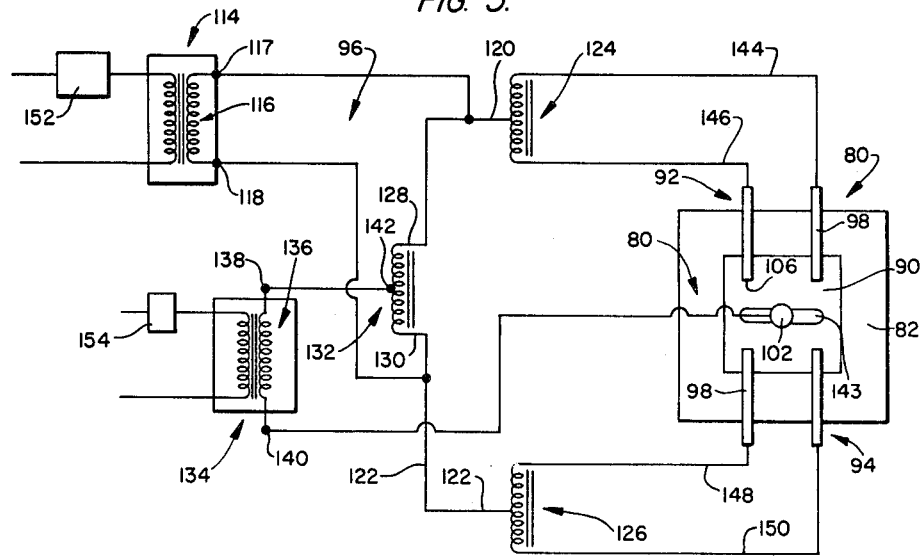
FIG. 5 illustrates a schematic of the power supply for the glass furnace illustrated in FIG. 4.

FIG. 5 illustrates an electrical schematic of the power supply 96 illustrated in FIG. 4. The power supply 96 includes a resistance heating power supply 114 which is comprised of a transformer 116 having secondary terminals 117 and 118 which are respectively coupled to the center taps 120 and 122 of first and second arrays of $n-1$ inductors 124 and 126 and to the ends 128 and 130 of a center tapped current splitting inductor 132. The power supply 96 further includes an arc power supply 134 which is comprised of a transformer 136 having secondary terminals 138 and 140 which are respectively coupled to the center tap 142 of the current splitting inductor 132 and to arc electrode 102. A slot 143 is provided in the batch cover 90 to permit visualization. The ends 144 and 146 of each of the first array of $n-1$ center tapped inductors 124 are coupled to a different individual electrode 98 within array 92 so that each electrode is coupled to only a single end of one of the inductors within the array. The ends 148 and 150 of each of the second array of $n-1$ center tapped inductors 126 are coupled to a different individual electrode 98 within array 94 so that each electrode is coupled to only a single end of one of the inductors within the array. An SCR 152 is provided in the input to transformer 116 of the resistance heating power supply 114 to permit control of the amount of current being drawn by electrodes 98 for resistance heating within the arrays 92 and 94 by adjusting the firing point of the SCR. An SCR 154 is provided in the input to transformer 136 to permit control of the amount of current being drawn by the arc electrode 102 by adjusting the firing point of the SCR. It should be understood that the number of electrodes 98 and associated current splitting inductors 124 and 126 illustrated in FIG. 5 was chosen for purposes of illustration and does not signify the limitation of the invention. For additional electrodes 98 which are added to the arrays 92 and 94, additional current splitting inductors must be added to the arrays 124 and 126 such that the current fed to each electrode 98 is equal. A single current splitting inductor 132 may be used to drive the center taps of each of the inductors within the arrays 124 amd 126 regardless of the number of inductors within the arrays 124 and 126. The individual electrodes 98 are equally spaced within the first and second arrays 92 and 94 and are mounted in opposed sides 82 of the chamber 80 so that corresponding individual electrodes are separated by the shortest possible distance.

Figure 6:
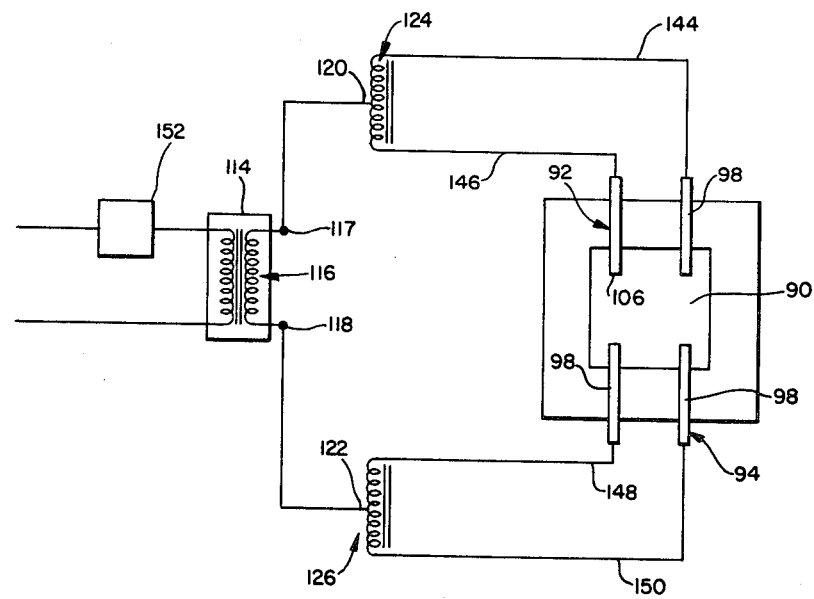
FIG. 6 illustrates a schematic of a modification of the power supply of FIG. 5 which does not use an arc electrode.

FIG. 6 illustrates a modification of the power supply of FIG. 5 which does not use an arc electrode. Like reference numerals in FIG. 6 designate the same parts described supra with reference to FIG. 5. FIG. 6 is identical to FIG. 5 except that the current splitting inductor 132, the arc transformer 136, and SCR 154 of FIG. 5 have been eliminated. The current splitting inductor 114 and the arrays of inductors 124 and 126 function to equalize the current flowing in the individual electrodes 98.

Figure 7:
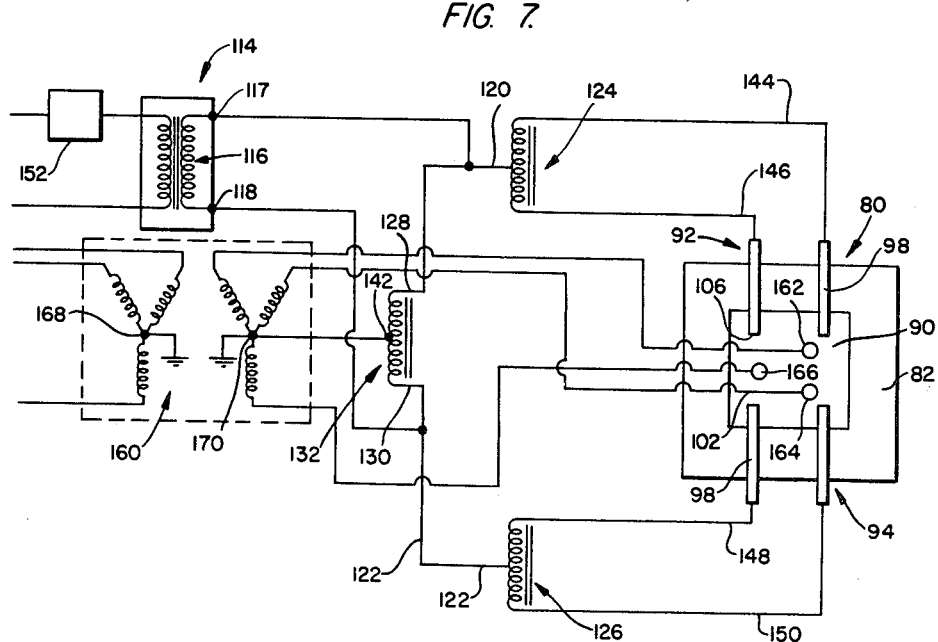
FIG. 7 illustrates a schematic of a power supply of the type illustrated in FIG. 5 which utilizes a three phase power supply for powering three arc electrodes.

FIG. 7 illustrates a modification of FIG. 5 which utilizes a three phase power supply for driving three arc electrodes. Like reference numerals are used to identify identical parts in FIGS. 5 and 7. A conventional wye-configuration three phase power supply 160 is provided for driving three arc electrodes 162, 164 and 166 which are symmetrically positioned within the chamber 80 above the surface of the molten glass to draw three separate arcs. Each of the arc electrodes 162, 164 and 166 is connected to a separate leg of the secondary of a three phase transformer bank 168 of the power supply 160. The midpoint 170 of the secondary is grounded and also is coupled to the center tap 142 of the current splitting inductor 132. The arrays 92 and 94 of electrodes 98 are positioned in the sidewalls 82 of the chamber 80 as illustrated in FIGS. 4 and 5.

The electrode power supply circuits of FIGS. 1–7 each equalize the flow of current through the individual electrodes disposed within the molten glass. The equalization of the flow of current in each electrode within the glass is produced by applying electrical power for driving either the electrodes directly or indirectly through additional cascaded current splitting inductors through the center tap of an inductor having ends which are respectfully coupled either directly to electrodes or to the center taps of the additional cascaded current splitting inductors. When the current being drawn by one of the electrodes increases without a concomitant increase in current in the other electrode or circuit branch within the array, the magnetic flux in the half of the inductor between the center tap and the point of the connection having increased current flow increases which induces an opposing EMF in the inductor in accordance with Lenz's law of magnetic induction. This induced EMF opposes the increase in the current flowing in the electrode having the increased flow and causes an increase of current flow in the other half of the inductor which tends to equalize the current flowing in both circuits coupled to the ends of the inductor. Similarly, the current splitting inductor equalizes the flow of current in each of the arrays. An array of electrodes n where $n=(2)^x$, and x equals 1 to infinity can be constructed by cascading current splitting inductors where the ampere turns on each side of the center tap are equal. For all other arrays of electrodes where n does not fall in the group $n=(2)^x$ the current splitting inductors must be configured such that the ampere turns on each side of the center top are not equal but are such that the electrodes in the array have the flow of current equalized.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

I claim:

1. An electrical furnace comprising:
   (a) a chamber adapted for holding a body of molten glass, said chamber having a bottom and a plurality of sides which contain said molten glass, and an opening in the top for supplying batch thereto to be melted into said glass;
   (b) a first array of n spaced apart electrodes, wherein n is an integer greater than two, disposed within said chamber in electrical contact with said glass;
   (c) a second array of n spaced apart electrodes disposed within said chamber in electrical contact with said glass, said second array being opposed to said first array,
   (d) first means for supplying electrical current to said first and second arrays of electrodes to cause electrical current to flow between said arrays of electrodes through said glass to cause heating thereof;
   (e) means for causing the flow of a substantially equal amount of current within each of said n electrodes within each array, said means comprising a first array of n−1 center tapped magnetic inductors, wherein n is an integer greater than two, each having two ends, the ends of each of the inductors within the first array being coupled to a different one of said n electrodes directly or indirectly through cascaded inductors within said first array of electrodes and the center tap of each inductor within the first array of inductors being coupled to a first output of said means for supplying electrical current and a second array of n−1 center tapped magnetic inductors, each having two ends, the ends of each of the inductors within the second array being coupled to a different one of said n electrodes directly or indirectly through cascaded inductors within the second array of inductors and the center tap of each inductor within the second array of inductors being coupled to a second output of said means for applying electrical current;
   (f) a current splitting inductor having a center tap and two ends, the ends of the current splitting inductor being respectively coupled to the first and second arrays of n−1 center tapped inductors;
   (g) an arc electrode disposed above said glass for the purpose of causing electrical current to flow through the batch for melting the batch and heating the glass;
   (h) second means for supplying electrical current to cause current to flow between said arc electrode and said arrays of electrodes through said glass, the center tap of said current splitting inductor being coupled to said second means for supplying electrical current; and
   i means disposed in the bottom of said chamber for forming fibers from said molten glass.

2. A furnace in accordance with claim 1 wherein:
   (a) said means for supplying electrical current to said arrays of electrodes comprises a transformer having two inputs and two outputs, the outputs being respectively coupled to the center taps of the first and second arrays of inductors and the inputs being adapted to be coupled to a source of alternating current; and
   (b) said means for causing electrical current to flow between said arc electrode and said arrays of electrodes through said glass comprises an arc transformer having two inputs and two outputs, and the center tap of said current splitting center tapped inductor being coupled to one of said outputs of said arc transformer, the other of said outputs of said arc transformer being coupled to said arc electrode, and the ends of said center tapped inductor being respectively coupled to the center taps of the first and second arrays of center tapped inductors.

3. A furnace in accordance with claim 2 further comprising:
   (a) a first switching device disposed within one of said inputs of said transformer for supplying electrical current to said arrays of electrodes for permitting alternating current to flow through said input when said switching device is closed and interrupting current flow when said switching device is open; and
   (b) a second switching device disposed within one of said inputs of said arc transformer for permitting alternating current to flow through said input when said switching device is closed and interrupting current flow when said switching device is open.

4. A furnace in accordance with claim 3 wherein said switching devices are silicon controlled rectifiers.

5. A furnace in accordance with claims 1 or 2 wherein said first and second arrays of electrodes are respectively mounted in opposed sides of said chamber, each electrode within each array being equally spaced from adjacent electrodes, the arrays of electrodes being mounted in said opposed sides so that corresponding electrodes within each array are separated by the shortest possible distance through said glass.

6. An electric glass-melting furnace comprising a chamber adapted for holding a body of molten glass which has a negative temperature coefficient of resistance, means for supplying batch to said chamber for making said molten glass, means for withdrawing molten glass, an arc electrode positioned above the upper surface of said body of molten glass, one or more pairs of electrodes positioned in electrical contact with said body of molten glass which will tend to individually conduct unequal amounts of current when localized higher temperatures occur in said molten glass, means for causing current to flow between said arc electrode and said plurality of electrodes through said glass, and means for causing a substantially equal amount of current to flow within the individual electrodes positioned in electrical contact with said glass independent of localized high temperatures within said glass, said means for causing a substantially equal amount of current to flow comprising one or more center tapped magnetic inductors each respectively associated with different pairs of said electrodes, each inductor having two ends which are respectively coupled to a different one of said electrodes within a pair of electrodes to which said inductor is coupled, said one or more center taps being coupled to said means for causing current to flow between said arc electrode and said plurality of electrodes.

7. An electrical glass furnace comprising:
(a) a chamber, adapted for holding a body of molten glass which has a negative temperature coefficient of resistance, having a bottom and a plurality of sides which contain said molten glass, and an opening in the top for supplying batch thereto to be melted into said glass;
(b) a pair of spaced apart electrodes disposed within said chamber in electrical contact with said glass which will tend to individually conduct unequal amounts of current when localized higher temperatures occur in said molten glass which lowers the resistivity of said glass where the localized higher temperatures occur;
(c) an arc electrode disposed above said chamber for the purpose of causing electrical current to flow through the batch for melting the batch and heating said glass;
(d) means for supplying current to said arc electrode and said pair of electrodes to cause electrical current to flow between said arc electrode and said pair of electrodes through said glass to cause heating thereof; and
(e) a center tapped magnetic inductor having two ends which are respectively coupled to said pair of spaced apart electrodes, said center tap being coupled to said means for supplying electrical power, said center tapped inductor causing a substantially equal amount of current to flow within said pair of spaced electrodes independent of localized high temperatures within said glass.

8. The furnace of claim 7 wherein said spaced apart electrodes are disposed in the bottom of said furnace.

9. A furnace in accordance with claim 7 further comprising:
(a) two additional arc electrodes disposed above the surface of said body of molten glass, and wherein said means for supplying electrical power comprises:
(b) a three phase power supply having a common point and three terminals, the common point being connected to said center tap of said inductor and each of said terminals of said power supply being connected to a different one of said three arc electrodes.

10. An electrically powered furnace in accordance with claim 9 wherein:
(a) said means for supplying electrical current comprises a first power supply means for causing current to flow between said arc electrode and said spaced apart electrodes, said first power supply means being coupled to said center tap of said inductor and to said arc electrode; and
(b) a second power supply means for causing current to flow through said glass between said electrodes, said second power supply means being coupled to the first and second electrodes.

11. An electrically powered furnace in accordance with claim 10 wherein:
(a) said second power supply means comprises a transformer having a secondary winding which is said center tapped inductor; and
(b) said first power supply means comprises a transformer.

12. A furnace in accordance with claim 1 further comprising:
(a) three spaced apart arc electrodes disposed above said chamber for the purpose of drawing arcs between said glass and said arc electrodes to cause heating of said glass;
(b) a current splitting inductor having a center tap and two ends, the ends being respectively coupled to the center taps of the individual inductors within the first and second arrays of n−1 center tapped inductors; and
(c) a three phase power supply for causing current to flow between said arc electrodes and said first and second arrays of electrodes, said three phase power supply having a common point and three terminals, the common point being coupled to said current splitting inductor and each of said three terminals being coupled respectively to different one of said arc electrodes.

13. An electric glass-melting furnace comprising: a chamber adapted for holding a body of molten glass, said chamber having means for supplying batch thereto and means for withdrawing molten glass therefrom; an arc electrode positioned in said chamber above the upper surface of said body of molten glass; first and second electrodes positioned in said body of molten glass; a magnetic reactance means comprising a coil wound on a core, said coil having a first and a second end, the first end of said coil being connected to said first electrode and the second end of said coil being connected to said second electrode; and means for supplying electrical power to said arc electrode and said first and second electrodes, a first terminal of said power supplying means being connected to said arc electrode and a second terminal being connected to said center tap.

14. An electric glass-melting furnace as recited in claim 13, wherein said first and second electrodes are positioned in the bottom of said chamber.

15. An electric glass-melting furnace as recited in claim 13 or 14, wherein said arc electrode comprises three arc electrodes positioned in said chamber above the surface of said body of molten glass; and said power supplying means comprises a three phase power supply connected in a wye-configuration with the second terminal being connected to said center tap and two additional terminals, each of the two additional terminals and the first terminal being connected to a different one of said three arc electrodes.

16. An electric glass-melting furnace as recited in claim 13, wherein said furnace further comprises: a second means for supplying electrical power having first and second terminals, a first terminal of said second power supplying means being coupled to said first electrode and a second terminal of said second power supplying means being coupled to said second electrode.

17. An electric glass-melting furnace as recited in claim 16, wherein said second power supplying means comprises a transformer having a secondary winding with a center tap and said reactance means comprises said secondary winding of said transformer.

* * * * *